(12) United States Patent
Schreier et al.

(10) Patent No.: US 7,082,893 B2
(45) Date of Patent: Aug. 1, 2006

(54) AQUACULTURE NITROGEN WASTE REMOVAL

(75) Inventors: Harold J. Schreier, Baltimore, MD (US); Yossi Tal, Rehovot (IL); Yonathan Zohar, Baltimore, MD (US)

(73) Assignee: University of Maryland Biotechnology Institute, Baltimore, MD (US)

( * ) Notice: Subject to any disclaimer, the term of this patent is extended or adjusted under 35 U.S.C. 154(b) by 122 days.

(21) Appl. No.: 10/818,136

(22) Filed: Apr. 5, 2004

(65) Prior Publication Data

US 2004/0244715 A1    Dec. 9, 2004

Related U.S. Application Data

(60) Provisional application No. 60/460,228, filed on Apr. 3, 2003.

(51) Int. Cl.
*C02F 3/32* (2006.01)
*A01K 63/04* (2006.01)

(52) U.S. Cl. .................. 119/259; 119/260; 210/602
(58) Field of Classification Search ............. 119/215, 119/217, 259, 260, 261
See application file for complete search history.

(56) References Cited

U.S. PATENT DOCUMENTS

| | | | |
|---|---|---|---|
| 3,116,712 A | 1/1964 | Ogden et al. | |
| 3,661,119 A | 5/1972 | Sanders | |
| 4,559,142 A * | 12/1985 | Morper | 210/607 |
| 5,176,100 A | 1/1993 | Fujino | |
| 5,353,745 A | 10/1994 | Fahs, II | |
| 5,482,630 A | 1/1996 | Lee et al. | |
| 5,545,326 A * | 8/1996 | Petering | 210/605 |
| 5,660,142 A | 8/1997 | Van Rijn | |
| 5,747,311 A | 5/1998 | Jewell | |
| 5,961,831 A * | 10/1999 | Lee et al. | 119/227 |
| 6,171,480 B1 | 1/2001 | Lee et al. | |
| 6,443,097 B1 * | 9/2002 | Zohar et al. | 119/217 |
| 6,447,681 B1 * | 9/2002 | Carlberg et al. | 119/227 |
| 6,599,423 B1 * | 7/2003 | Boles et al. | 210/606 |
| 2005/0087489 A1 * | 4/2005 | Tal et al. | 210/602 |

FOREIGN PATENT DOCUMENTS

WO    WO 98/50311    * 11/1998

OTHER PUBLICATIONS

Rusten, B., et al. "Pilot testing and preliminary design of moving bed biofilm reactors for nitrogen removal at the FREVAR wastewater treatment plant." Water Science and Technology, vol. 41, (2000), pp. 13-20.

(Continued)

*Primary Examiner*—Teri Pham Luu
*Assistant Examiner*—Elizabeth Shaw
(74) *Attorney, Agent, or Firm*—Steven J. Hultquist; Intellectual Property/Technology Law (57) ABSTRACT

The present invention relates to a two-stage biofilter reactor system for removing nitrogenous compounds from a recirculating aquaculture system. The system includes a aerobic nitrification unit and a downstream anaerobic denitrification unit, wherein both units have a mobile bed of suspended media whereon bacteria can grow and reduce nitrate and/or ammonia levels in the recirculating aquaculture system. Use of the two-stage system has the advantage of reducing the water exchange rates and consumption of salt when maintaining a saline effluent.

20 Claims, 2 Drawing Sheets

OTHER PUBLICATIONS

Rusten, Bjørn, et al. "Moving Bed Biofilm Reactors and Chemical Precipitation for High Efficiency Treatment of Wastewater from Small Communities." Wat. Sci. Tech., vol. 35, (1997), pp. 71-79.

Tal, Yossi, et al. "Characterization of the microbial community and nitrogen transformation processes associated with moving bed bioreactors in a closed recirculated mariculture system." Aquaculture, vol. 215, (2003), pp. 187-202.

* cited by examiner

AQUACULTURE NITROGEN WASTE REMOVAL

CROSS-REFERENCE TO RELATED APPLICATIONS

This application claims priority from U.S. Provisional Patent Application No. 60/460,228 filed on Apr. 3, 2003 in the names of Harold J. Schreier, Yossi Tal and Yonathan Zohar for "AQUACULTURE NITROGEN WASTE REMOVAL," the contents of which are incorporated by reference herein for all purposes.

BACKGROUND OF THE INVENTION

1. Field of the Invention

The present invention relates to nitrogen removal, and more particularly, to an aquaculture system including a denitrification unit for denitrifying aquatic effluent by anaerobic bacteria in combination with a nitrification unit.

2. Description of the Related Art

The development of technology and protocols that will enable the aquaculture industry to expand production of aquatic species in urban recirculating systems requires systematic examination of each aspect of said aquatic systems. Many conventional aquaculture systems are known and can be classified in one of two ways; closed and open systems. Natural environments, such as lakes and streams, most easily typify open systems. Closed systems may be defined as completely closed with constant recirculation and a quasi-closed system can include some recirculation and a portion of the output may be recycled as part of the new input. Regardless of which system is utilized, optimal growth of the aquatic species is directly related to the environmental parameters, and as such, pollutants and waste by-products must be removed from the system to assure the species viability.

In most closed and quasi-closed aquaculture systems, ammonia is oxidized to nitrite $NO_2^-$ in an aerobic biofilter by autotrophic bacteria. Nitrate is more toxic then the ammonium ion, so a second bacterium is required to oxidize the nitrite to nitrate. While nitrate is considerably less toxic than ammonium or nitrate, it can also be a problem. Nitrate is typically removed from recirculating culture systems by water exchange. However, water exchange has several drawbacks. First, water removal in aquaculture systems normally involves a slow exchange with a thorough mixing of old and new water to avoid stressing the cultured aquatic species. Second, in systems where natural sea water is unavailable, deionized water and sea salts must be mixed, which may incur heavy additional costs. Finally, the high nitrate effluent must be normally discharged.

However, the discharge of the high nitrate effluent is potentially a problem, since salt water cannot typically be discharged into a sewage system or a fluvial system. Further, there is a growing environmental concern about the discharge of nitrogenous waste. Discharge permits may be complex and often require very stringent pollutant limits. Thus, attempts have been made to denitrify the discharge. However, because denitrification is exclusively an anaerobic process, the process is rarely included in any biofiltration systems that require oxygenated water, as is the case in aquaculture systems. In order to achieve anaerobic conditions that would stimulate denitrification, many filtration systems require the addition of organic compounds to promote oxygen consumption during degradation by heterotrophic bacteria (and induce anaerobic pockets), as well as to serve as electron donors to support biological nitrate reduction in denitrifying biofilters. Additionally, alcohols, volatile fatty acids and sugars, which are often used as carbon sources for such systems, often lead to bacterial blooms, toxic by-products, among other problems, and result in elevated system costs. Thus, the disadvantages of stimulating denitrifying activity often outweigh the advantages. Accordingly, it would be advantageous to develop a system and method that uses denitrification as a viable means of nitrate removal and that addresses at least some of the shortcomings of the prior art systems.

SUMMARY OF THE INVENTION

The present invention relates to a recirculating aquaculture system that combines a separate anaerobic denitrification unit connected to a nitrification unit, thereby providing a two-stage nitrogen removal system. The system further provides for nitrogen removal via the anaerobic ammonia oxidation (anammox) process, which involves the reduction of ammonia to nitrogen gas using nitrite as an electron acceptor.

In one aspect, the present invention provides for a recirculating aquaculture system comprising:

an aquatic species rearing tank for holding an aqueous effluent;

a first biofilter reactor in fluid communication with the rearing tank, wherein the first biofilter reactor comprises suspended media means for supporting growth of microorganisms active in nitrification;

a second biofilter reactor, positioned downstream and in fluid communication with the first biofilter reactor, wherein the second biofilter reactor comprises suspended media means for supporting growth of microorganisms active in denitrification; and means for circulating effluent between the rearing tank and first and second biofilter reactors.

In another aspect, the present invention provides for a recirculating aquaculture system comprising:

an aquatic species rearing tank for holding fresh water or salt water effluent, an aerobic biofilter reactor in fluid communication with the rearing tank, wherein the aerobic biofilter reactor comprises a tank having an inlet and an outlet for movement of the effluent therein, media means to support the growth of microorganisms active in nitrification suspended within the fresh water or salt water effluent, and aeration means to inject air or oxygen into the fresh water or salt water effluent for effective aerobic nitrification by the microorganisms;

an anaerobic biofilter reactor in fluid communication with the aerobic biofilter reactor and positioned downstream from the aerobic biofilter reactor, wherein the anaerobic biofilter reactor comprises a tank having an inlet and outlet for movement of the effluent from the aerobic biofilter reactor therethrough, media means to support the growth of microorganisms active in denitrification suspended within the fresh water or salt water effluent, and means for introducing a carbon source and optionally a nitrite source into the anaerobic biofilter reactor for effective denitrification by the microorganisms; and means for circulating effluent between the rearing tank and first and second biofilter reactors, wherein the media in the aerobic and anaerobic biofilter reactors is kept in motion within the fresh water or salt water effluent.

In yet another aspect, the present invention relates to a method for removing nitrogenous products from a recirculating aquaculture system, the method comprising:

housing an aquatic species in a rearing tank containing fresh water or salt water effluent contaminated with ammonia;

introducing and circulating the fresh water or salt water effluent into an aerobic biofilter reactor and treating the effluent with aerobic microorganisms active in nitrification for a sufficient time to reduce ammonia concentration and increase concentration of nitrates, wherein the microorganisms are positioned on media means to support the growth of the microorganisms and wherein the media means is suspended within the fresh water or salt water effluent, removing the nitrified fresh water or salt water effluent from the aerobic biofilter reactor and introducing same into an anaerobic biofilter reactor for treatment with anaerobic microorganisms active in denitrification for a sufficient time to reduce concentration of nitrates, wherein the microorganisms are positioned on media means to support the growth of the microorganisms and wherein the media means is suspended within the fresh water or salt water effluent; and introducing the denitrified effluent into the rearing tank.

Other features and advantages of the invention will be apparent from the following detailed description, drawings and claims.

DETAILED DESCRIPTION OF THE INVENTION

Disclosed is an anaerobic denitrification unit (ADU) for the reduction of nitrate and/or ammonia levels in a recirculating aquaculture system. Preferably the anaerobic denitrification unit comprises a mobile bed of suspended media whereon bacteria can grow and denitrify nitrate and ammonia. Use of this anaerobic denitrification unit has the advantages of reducing the water exchange rates and consumption of salt for maintaining a saline effluent.

Figure 1:
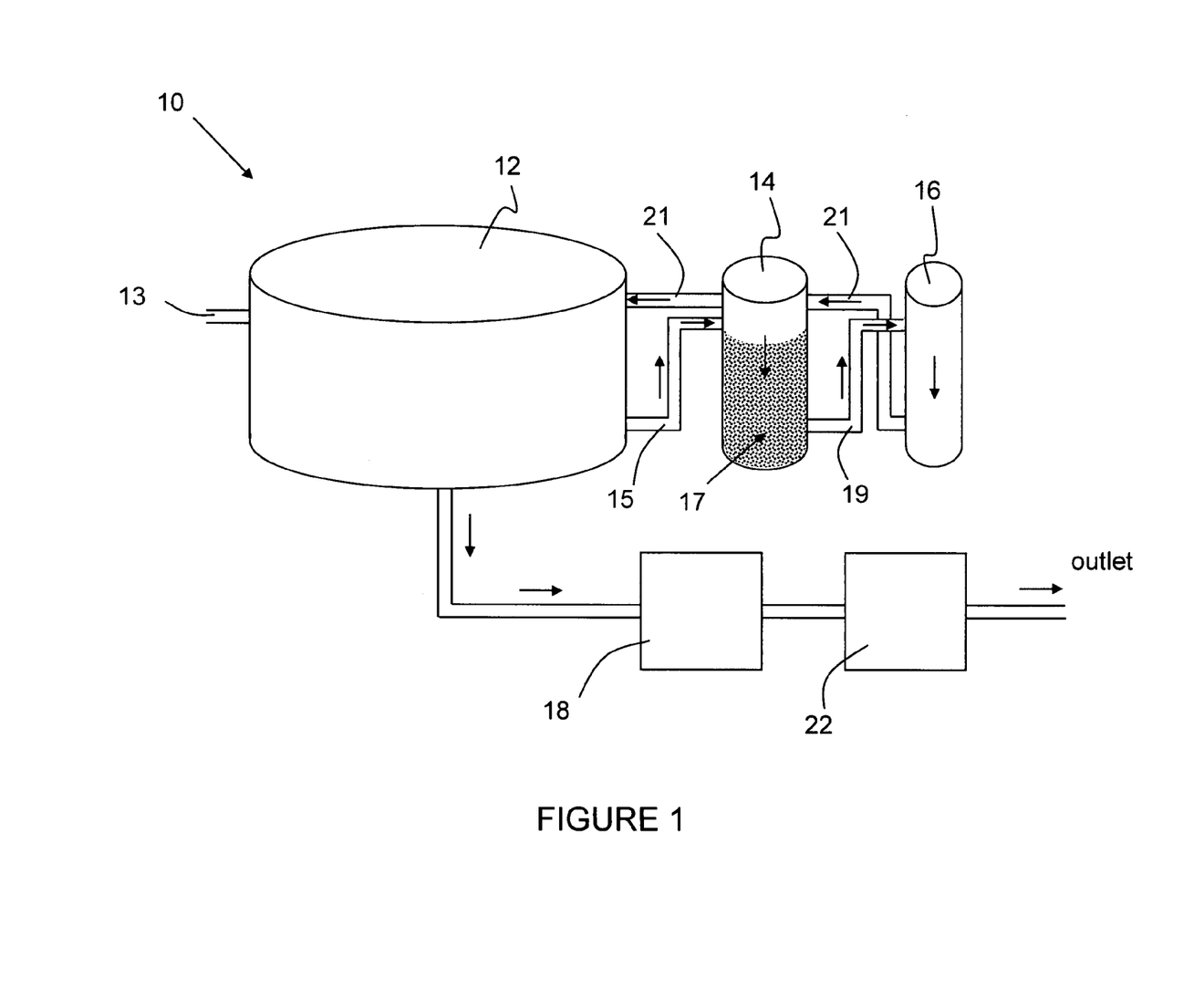
FIG. 1 shows an aquaculture system of the present invention.

Referring to the drawings, there is shown in FIG. 1 a recirculating aquaculture system of the present invention 10 comprising an aquatic species rearing tank 12 for containing a fresh water or salt water effluent or any other aqueous medium suitable for a primary cultured aquatic species. Associated with the rearing tank are various components, conduits and the like. While there may be an optimum location for the aerobic biofilter reactor 14 and anaerobic biofilter reactor 16, those locations will be specified hereinafter with a discussion of the particular components. The schematic illustration of FIG. 1 includes arrowheads indicating the general direction of the flow of effluent through the system. Pumps are not shown, but one skilled n the art could readily determine where pumps should be placed, the type of pump to use and the direction in which the pump would pump the fluid, particularly in view of the directional arrows and in view of the context of this direction.

As shown in FIG. 1, the rearing tank 12 may be any configuration and fabricated from any appropriate material that is compatible with the aquatic species reared therein.

The rearing tank further comprises a nutrient supply means 13 for introducing food, vitamins, minerals or other nutrients to the aquatic species. A valved conduit 15 allows for selective or continuous removal of a portion of the aqueous effluent from the rearing tank for transference to aerobic biofilter reactor 14.

The biofilter reactor 14 is preferably a moving bed bioreactor (MBB) comprising suspended media for the support and growth of microorganisms, including nitrifying bacteria. These support media components, also known as biomass carrier structures can be constructed from a variety of materials into a variety of shapes and sizes. For example, natural or artificial materials can be used, such sponges, synthetic foams, both open-celled and close-celled foams, and extruded plastics, both specially designed extruded plastic and recycled waste plastic. One embodiment contemplates extruded plastic pipe cut into certain short lengths. This pipe can be shaped so as to increase the surface area available to microorganisms for maximum growth. While the pipe may be constructed of plastic materials such as polyethylene or polypropylene, other materials are also contemplated as well as the mixing of certain additives to the plastic material to alter density.

Another embodiment contemplates biomass carrier structures comprised of polyurethane foam cut into cubes, spheres, or other regular and non-regular shapes, that provide a large amount of well-aerated surface area for the support and growth of microorganisms, including nitrifying bacteria.

Preferably, the moving bed reactor comprises biomass carrier structures fabricated from polyethylene with a density slight lower than water. The biomass carrier structures are suspended in the effluent and maintained therein by air diffusers and/or propeller mixers within the biofilter reactor. The biomass carrier structures are retained by means of suitably sized sieves or plates. With a density slightly less than water, this support media provides a large protected surface for bacteria. The moving bed process creates optimum biological conditions as the air circulates and oxygen is dispersed therein. Preferably, the polyethylene carriers are wheel shaped with longitudinal fins on the outside that provide a large protected surface for placement of a biofilm that provides optimal conditions for the bacteria culture when the biomass carrier structures are circulated in the effluent.

Microbes suitable for the practice of the present invention include bacteria, yeast, fungi, or protozoa, all of which must be capable of metabolizing the ammonia into less toxic nitrogenous compounds such as nitrate.

Selection of a particular microbe for a particular application is based upon a number of factors which will be apparent to those skilled in the art, such as the nature of the nitrogenous compound being converted, the necessary conversion efficiency, the availability of microbes capable of effecting the conversion, the conditions under which the reaction is to be conducted (temperature, presence or absence of oxygen, presence or absence of other materials contaminating the reactant or byproducts of the reaction which are toxic to the microbes), the biomass carrier employed, and the ease of attaching the microbes to the biomass carrier. By way of illustration, microbes suitable for the treatment of aquaculture effluent include aerobic nitrifying bacteria, such as microbes capable of effecting nitrification include *Nitrosomonas* and *Nitrobacter*.

The biomass carrier structures used in the practice of the present invention can be provided in a number of ways. One way is to obtain the biomass carrier structures from a bioreactor, which has been in operation. Another way is to prepare the biomass carrier by attaching the microbes to the carrier. The means by which the microbes are attached to the biomass carrier is not critical to the practice of the present invention. Typically, microbes form films on surfaces of almost any material with which they are in contact during replication without regard to the material's surface morphology (i.e. without regard to whether the surface is smooth, creased, or roughened). Consequently, the easiest way in which to attach microbes to the carrier is to expose the carrier to microbes under conditions effective for the microbes to attach to the carrier surface and effective for the microbes to replicate. This replication can be effected during the practice of and as part of the process of the present invention, in which case efficiencies, of course, will be reduced during the time in which microbial equilibrium is established, or replication can be effected separately and completed prior to use of the particulate material in the practice of the present invention.

It is typically advantageous to seed the carrier structure with higher concentrations of microbe during start-up or at times when inhibitory conditions exist. These higher concentrations of appropriate microbes can be obtained from a variety of sources known to those skilled in the art. For example, nitrifying bacteria, suitable for the treatment of ammonia-rich aquaculture waste, can be obtained in concentrated form by removing biofilms from on-going aquaculture biofilters or from freshwater or marine sediments. After seeding the carrier structures, conditions are maintained which are effective for microbial population growth. As the microbe population increases, the microbes naturally form films on the surface of the carrier structures that reach an equilibrium thickness in several weeks. The thickness of the microbial film at equilibrium depends primarily on the type of microbe. Where the microbe is aerobic, films suitable for the practice of the present invention have a thickness of from about 50 µm. to about 500 µm.

The nitrifying bacteria remove substantial amounts of solubilized ammonia by metabolizing the ammonia to form nitrates. The basic process of ammonia contaminant breakdown consist of nitrification. Nitrification breaks down ammonia in solution to nitrate as follows:

$$NH_4^+ \longrightarrow NO_2^- \longrightarrow NO_3^-$$

The oxidation of ammonia to nitrate is a two step sequential biological process involving two different autotrophic bacteria, most commonly of the genus *Nitrosomonas* sp. and *Nitrobacter* sp. that utilize the ammonia as an energy source. Preferably, the biomass carrier structures in the aerobic biofilter reactor vessel are kept in continuous motion at an effluent flow velocity of about 0.15 to about 2.00 cubic feet per second. Continuous movement is maintained by air diffusers in the aerobic biofilter reactors and/or by means of propellers mixer in the reactor. The aerobic biofilter reactor is preferably equipped with a diffused air system, which supplies air/oxygen to the system. In the aerobic biofilter reactor the concentration of dissolved oxygen has to be relatively high because the dissolved oxygen is the limiting factor in the nitrification process. Typically, the preferred aerobic biofilter moving bed reactor operates at a dissolved oxygen concentration of about 4 to about 8 mg/l. WO 91/11396 (Rusten) provides additional technical information for optimal performance of the preferred aerobic biofilter reactor of the present invention, the contents of which are hereby incorporated by reference herein for all purposes.

Optimization of flow rates through the aerobic biofilter reactor depends primarily on the characteristic reaction rate of the microbe with the ammonia, the concentration of the ammonia or other nitrogenous components, the operating interfacial surface area of the biomass carrier structures, particulate material, and the density of the material of the biomass carrier structures relative to the fluid in which it is dispersed. The flow can have both a vertical and a horizontal component. The vertical component can be either upward or downward. In cases where the material of the biomass carrier structures has a specific gravity greater than that of the aqueous effluent, an upward vertical flow effective to form an expanded bed is preferred. Alternatively, a downward vertical flow effective to form an expanded bed is advantageous where the material has a specific gravity less than the specific gravity of the aqueous effluent.

In addition to the removal of ammonia from the aquaculture effluent, the aerobic biofilter reactor removes significant amounts of carbon dioxide from the aquaculture effluent. The carbon dioxide is a naturally occurring metabolic product of fish respiration and may rise to toxic levels if left in solution and not removed. The carbon dioxide also decreases pH levels of the water that can reach unacceptable parameters in aquaculture systems.

Within aerobic biofilter reactor 14, biomass carrier structures 17 are floating in the aqueous effluent, wherein the biomass carrier material has a specific gravity less than the specific gravity of the aqueous effluent. Discharge conduit 19 is located at the bottom and at the opposite end of aerobic biofilter reactor 14. The location of inflow tube and discharge conduit necessitates that the aqueous effluent flow vertically downward and horizontally. In operation, aqueous effluent from the rearing tank, flows horizontally and vertically through biomass carrier structures, and is chemically modified by the microbes that form the surface of the biomass carrier structures and is discharged through outflow conduit 19.

In addition to providing a two-stage nitrification/denitrification system by which nitrogenous components are chemically modified by microbes, the system of the present invention also permits the efficient separation of suspended particles in the aquaculture effluent. This feature is particularly advantageous in the treatment of aqueous effluent, which frequently contains suspended solids that must be removed. Since filtration of suspended solids is strictly a physical phenomenon, and is not dependent on the presence or absence of microbes attached to the carrier, the system of the present invention can be modified by a filtration unit 18 comprising a particulate material, devoid of microbes, to maximize suspended solids filtration. The effluent can be further pumped to sump 22 for removal from the system or further recirculation.

After undergoing aerobic nitrification within the aerobic biofilter reactor, the partially treated effluent is delivered to an anaerobic biofilter reactor for denitrification. The aerobic biofilter reactor and the anaerobic biofilter reactor are similarly constructed and have basically the same components, excepting for the air diffuser for keeping the carrier elements in suspension. Preferably, in the anaerobic biofilter reactor, the continuous movement of the biomass carrier structures and aqueous effluent is facilitated by means of a propeller mixer.

The denitrification process involves a reduction of nitrite to nitrogen gas through the following sequence in which bacteria, preferably heterotrophic bacteria (such as

*Clostridiu, Pseudomonas, Aeromaonas* and *Bacillis*) reduce the nitrate to a lower state of oxidation, expressed as follows:

$$NO_3^- \longrightarrow NO_2^- \longrightarrow NO \longrightarrow N_2O \longrightarrow N_2$$

During this reaction heterotrophic bacteria use a carbon based material as an energy source. Preferably, the carbon based material is introduced in an amount necessary to convert nitrate to nitrogen gas, and more preferably in an amount such that the atomic ratio of carbon from the carbon based material to nitrogen in the nitrate (C:N) is from about 1:1 to about 6:1. As defined herein, a carbon based material is understood to be any source of carbon, which can by used by bacteria for metabolism and growth. Examples of carbon sources include, but are not limited to monosaccharides, oligosaccharides and polysaccharides. Monosaccharides include, but are not limited to glyceraldehydes, dihydroxyacetone, erythrose, arabinose, ribose, xylose, galactose, glucose, mannose, fructose, and tagatose. Oligosaccharides include but are not limited to sucrose, lactose, maltose, threhalose and raffinose. Polysaccharides include but are not limited to glucans such as starch, glycogen and dextran, mannans, fructans, xylans, arabinans and chitosan. Furthermore, any method can be used to deliver the carbon based material. The carbon based material may be added continuously or in batch, added neat or with other additives, fillers and/or liquids. The anaerobic bioreactor system may further include utilizing oxygen scavengers for reduction of oxygen content in the effluent thereby increasing the effectiveness of the anaerobic bacteria.

Interestingly, several members of the genus *Bacillus* (mainly *Bacillus sphaericus*) involved in the denitrification process were identified in the system and excrete high levels of amylase, an enzyme used for the initial solubilization and degradation of the starch and therefore increase the denitrification process by increasing the availability of the carbon source.

In operation, the aqueous effluent is pumped from the lower region of the aerobic biofilter reactor and into the anaerobic biofilter reactor for treatment therein. The retention time of the aqueous effluent depends on the concentration of nitrate, and one skilled in the art will easily determine the time frame necessary to reduce the concentration of nitrates to less than 15 mg/L, and more preferably, less than 10 mg/L.

When the level of nitrates is considered acceptable the aqueous effluent is pumped back to the rearing tank either directly or through the aerobic biofilter reactor via conduit 21.

In another embodiment, the second stage biofilter reactor is used for anaerobic ammonia oxidation (anammox) which involves the reduction of ammonia to nitrogen gas using nitrite as a electron acceptor. The same components of the above-discussed moving bed bioreactor is used for ammonia oxidation. The ammonia oxidation rate is increased with the inclusion of nitrite as electron acceptor. Thus, aqueous effluent comprising both ammonia and nitrite increases reduction of both nitrite and ammonia. Preferably, the system comprises an anammox bacteria of the order *Planctomycetes* which is capable of anammox activity using nitrite in place of oxygen as the preferred electron acceptor and $CO_2$ as a sole carbon source.

It is contemplated that an anammox bacteria of the order *Planctomycetes* is used in combination the heterotrophic bacteria (such as *Clostridiu, Pseudomonas, Aeromaonas* and *Bacillis*) in the anaerobic biofilter reactor.

The present invention is further illustrated by the following examples that should not be construed as limiting in any way.

EXAMPLE 1

Nitrification and Denitrification in a Recirculating Aquaculture System

A 5-m³ circular fiberglass tank containing gilthead seabream, *Sparus aurata*, was operated at a density of 80 kg/m³ and feeding rate of 6 kg/day. The tank was connected to a 2-m³ moving bed bioreactor filled with 1 m³ of polyethylene beads having a specific surface area of 500 m²/m³ (4.86 cm²/bead) (Water Management Technologies, Baton Rouge, La., USA). A flow rate of 10 m³/h was set to enable two exchanges of water per hour through the filter. After four months of operation, 3000 beads from this high organic load MBB were transferred to a small experimental salt water system having a filter volume of 5 liter and tank volume of 150 liter. For nitrification activity, incubations were performed in a moving bed bioreactor of the present invention under aerobic conditions with the addition of 3 mg $NH_3$—N/L.

An anaerobic denitrifying moving bed bioreactor was directly attached to the aerobic biofilter reactor. The denitrifying unit consisted of a 300 L cylindrical tank containing 55 kg of KMT media (Kaidnes Miljoteknologi Ltd., Tonsberg, Norway) as biomass carrier structures. The KMT media is fabricated from polyethylene having a density of about 0.96 g/cm³ and wheel shaped with dimensions of approximately 7 mm long and 10 mm in diameter. Perforated plates retained the biomass carrier structures. The biofilter reactor was filled with up to about 60 to 75% of its volume with the KMT media.

Figure 2:
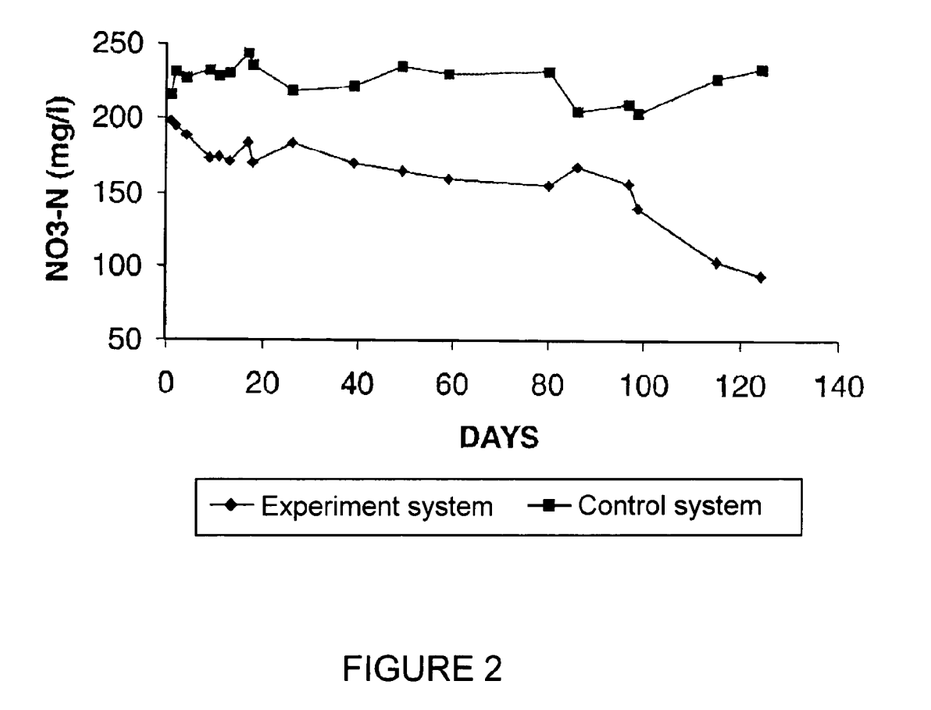
FIG. 2 shows nitrate accumulation in the aquaculture system of the present invention.

The anaerobic biofilter reactor, was fed daily with between 13% and 25% of system effluent with a retention time of from about an hour to about six hours with an average of about two hours. The flow of water occurred by way of the general circulation for the entire system. Water retention time through the anaerobic biofilter reactor was adjusted by controlling water flow. To stimulate denitrification activity granular corn starch (Sigma, 54126) was periodically added to the inflow end of the anaerobic biofilter reactor, which was metabolized by the heterotrophic microbial community within the biofilter. Oxygen levels were found to decrease 6 ppm at inflow to approx. 0.1–0.3 ppm at the anaerobic bioreactor outflow and was a major contribution to the stimulation of denitrification activity in the upper portion of the bioreactor. On an average, approximately 1 kg of starch was required for every 15 kg of fish food (45% protein) added to the system. Granular starch was found to be an efficient and low cost carbon source for stimulating denitrifying activity and required no additional maintenance since the starch degrades via a slow-release mechanism. The denitrifying anaerobic biofilter reactor was found to reduce 90% to 100% of the daily nitrate production by the nitrifying aerobic biofilter reactor resulting in minimum nitrate accumulation in the system, as shown in FIG. 2.

EXAMPLE 2

The two-stage biofiltration system comprising a aerobic biofilter reactor and an anaerobic biofilter reactor was used with two 4000 L tanks in which seabream were grown at 40–50 kg/m³ and fed daily at 1% of their body weight. During a four-month experimental period, daily water exchanges were obtained that averaged as low as approx. 1% of the tank volume. This water exchange was significantly lower than the 7% to 10% generally required by the system and this reduction in water exchange reduces the costs associated with salt from as high as 25% to as little as 3% of the total production cost, thereby considerably enhancing the profitability of such systems. Variations from the above described conditions are possible and can be varied by one of ordinary skill in the art. The examples provided are for illustration of the instant invention and are not intended to limit the scope of the disclosed invention

What is claimed is:

1. A recirculating aquaculture system comprising:
   an aquatic species rearing tank for holding fresh water or salt water effluent,
   an aerobic biofilter reactor in fluid communication with the rearing tank, wherein the aerobic biofilter reactor comprises a tank having an inlet and an outlet for movement of the effluent therein, media means to support the growth of aerobic microorganisms active in nitrification suspended within the fresh water or salt water effluent, and aeration means to inject air or oxygen into the fresh water or salt water effluent for effective aerobic nitrification by the microorganisms;
   an anaerobic biofilter reactor in fluid communication with the aerobic biofilter reactor and positioned downstream from the aerobic biofilter reactor, wherein the anaerobic biofilter reactor comprises a tank having an inlet and outlet for movement of the effluent from the aerobic biofilter reactor therethrough, media means to support the growth of anaerobic microorganisms active in denitrification suspended within the fresh water or salt water effluent, and means for introducing a carbon source and optionally a nitrite source into the anaerobic biofilter reactor for effective denitrification by the microorganisms; and
   means for circulating effluent between the rearing tank and aerobic and anaerobic biofilter reactors, wherein the media means in the aerobic and anaerobic biofilter reactors is kept in motion within the fresh water or salt water effluent;
   wherein the recirculating aquaculture system is characterized by at least one of (a)–(d);
   (a) the media means in the aerobic and anaerobic biofilter reactor being fabricated from polyethylene and having a wheel shape with about a 10 mm diameter;
   (b) the aerobic biofilter reactor being fed daily with between 13% and 25% of system effluent;
   (c) the anaerobic biofilter reactor being fed daily with between 13% and 25% of system effluent after passing through the aerobic biofilter reactor; and
   (d) The aerobic and anaerobic biofilter reactors comprising up to about 60% to about 75% of its volume with the biomas carrier structures.

2. The recirculating aquaculture system according to claim 1, wherein the effluent is saltwater.

3. The recirculating aquaculture system according to claim 1, wherein the effluent is fresh water.

4. The recirculating aquaculture system according to claim 1, wherein the media means in the aerobic and anaerobic biofilter reactor is fabricated from polyethylene.

5. The recirculating aquaculture system according to claim 1, wherein the media means in the aerobic and anaerobic biofilter reactor is fabricated from polyethylene and having a wheel shape with about a 10 mm diameter.

6. The recirculating aquaculture system according to claim 1, wherein the anaerobic microorganisms comprise an anammox bacteria of the order *Planctomycetes* which is capable of anammox activity using nitrite in place of oxygen as the preferred electron acceptor and $CO_2$ as a sole carbon source.

7. The recirculating aquaculture system according to claim 1, wherein the carbon source introduced into the anaerobic biofilter reactor is starch.

8. The recirculating aquaculture system according to claim 1, wherein the carbon source introduced into the anaerobic biofilter reactor is selected from the group comprising monosaccharides, oligosaccharides and polysaccharides.

9. The recirculating aquaculture system according to claim 1, wherein the aerobic biofilter reactor was fed daily with between 13% and 25% of system effluent.

10. The recirculating aquaculture system according to claim 1, wherein the anaerobic biofilter reactor was fed daily with between 13% and 25% of system effluent after passing through the aerobic biofilter reactor.

11. The recirculating aquaculture system according to claim 10, wherein the system effluent was retained from about an hour to about six hours to reduce concentration of nitrates in the system effluent.

12. The recirculating aquaculture system according to claim 1, the aerobic and anaerobic biofilter reactors comprise up to about 60 to about 75% of its volume with the biomass carrier structures.

13. A method for removing nitrogenous products from a recirculating aquaculture system, the method comprising:
    housing an aquatic species in a rearing tank containing fresh water or salt water effluent contaminated with ammonia;
    introducing and circulating the fresh water or salt water effluent into an aerobic biofilter reactor and treating the effluent with aerobic microorganisms active in nitrification for a sufficient time to reduce ammonia concentration and increase concentration of nitrates, wherein the microorganisms are positioned on media means to support the growth of the microorganisms and wherein the media means is suspended within the fresh water or salt water effluent,
    removing the nitrified fresh water or salt water effluent from the aerobic biofilter reactor and introducing same into an anaerobic biofilter reactor for treatment with anaerobic microorganisms active in denitrification for a sufficient time to reduce concentration of nitrates, wherein the microorganisms are positioned on media means to support the growth of the microorganisms and wherein the media means is suspended within circulating fresh water or salt water effluent; and
    introducing the denitrified effluent into the rearing tank;
    wherein said method is characterized by at least one of (a) and (b):
    (a) the biomass carrier structures in the aerobic and anaerobic biofilter reactors being kept in continuous motion at an effluent flow velocity of about 0.15 to about 2.00 cubic feet per second; and
    (b) introducing air/oxygen into the aerobic biofilter reactor, wherein the aerobic biofilter reactor comprises a dissolved oxygen concentration of about 4 to about 8 mg/l.

14. The method according to claim 13, wherein the denitrified effluent is passed through the aerobic biofilter reactor before reentry into the rearing tank.

15. The method according to claim 13, further comprising introducing a carbon source to the anaerobic biofilter reactor.

16. The method according to claim 13, further comprising introducing air/oxygen into the aerobic biofilter reactor.

17. The method according to claim 13, wherein the biomass carrier structures in the aerobic and anaerobic biofilter reactors are kept in continuous motion at an effluent flow velocity of about 0.15 to about 2.00 cubic feet per second.

18. The method according to claim 16, wherein the aerobic biofilter reactor comprises a dissolved oxygen concentration of about 4 to about 8 mg/l.

19. A recirculating aquaculture system including an aquaculture rearing tank coupled with a two-stage biofilter reactor assembly for removing nitrogenous compounds from a recirculating aquaculture medium, said two-stage bioreactor filter assembly including an aerobic nitrification unit and an anaerobic denitrification unit, wherein said anaerobic denitrification unit comprises microorganisms on support media comprising biomass carrier structures occupying at least 60% of the volume in said anaerobic denitrification unit, said microorganisms including at least one of:

(a) *Planctomycetes* having anammox activity, and (b) *Bacillus* producing amylase.

20. The recirculating aquaculture system of claim 19, wherein said aquaculture rearing tank contains fish in an aquaculture medium therein.

* * * * *

UNITED STATES PATENT AND TRADEMARK OFFICE
CERTIFICATE OF CORRECTION

PATENT NO. : 7,082,893 B2
APPLICATION NO. : 10/818136
DATED : August 1, 2006
INVENTOR(S) : Harold J. Schreier It is certified that error appears in the above-identified patent and that said Letters Patent is hereby corrected as shown below:

In column 9, line 10, a paragraph break should be inserted between "systems." and "Variations".

Signed and Sealed this

Twenty-first Day of November, 2006

JON W. DUDAS
*Director of the United States Patent and Trademark Office*